3,541,144
PROCESS FOR THE PREPARATION OF PROPIOLIC ACID
Robert J. Tedeschi, Whitehouse Station, and George L. Moore, South Plainfield, N.J., assignors to Air Reduction Company, Incorporated, New York, N.Y., a corporation of New York
No Drawing. Filed Dec. 30, 1966, Ser. No. 613,377
Int. Cl. C07c 51/32
U.S. Cl. 260—533    7 Claims

ABSTRACT OF THE DISCLOSURE

Disclosed is the preparation of propiolic acid and related compounds by reaction of alkali metal with liquefied acetylene and carbon dioxide.

This invention relates to the synthesis of organic compounds and particularly to the preparation of propiolic acid and/or alkali metal propiolates by the interaction of alkali metals, preferably sodium, with liquefied acetylene and carbon dioxide.

Propiolic acid has been prepared ordinarily by starting from sodium acetylide. For example, sodium propiolate has been prepared by reacting sodium acetylide, usually dissolved in certain solvents to give a highly active reaction medium, with carbon dioxide under pressure. In such processes, however, the distribution of the sodium acetylide and its surface properties are extremely important, making the cost of the acetylide starting material very high. Moreover, the yields obtained by these processes have not been satisfactory and accordingly propiolic acid has not been available as an economic starting material for the production of industrial chemicals such as propiolic acid esters or acrylic acid.

It is the object of this invention to provide an improved process for the preparation of propiolic acid. More specifically, it is the object of this invention to provide a process for producing propiolic acid using liquefied acetylene and carbon dioxide and sodium metal as starting materials. These and other objects will be apparent from the detailed description of this invention which follows.

It has now been found that propiolic acid may be readily prepared in a simple, one-step process using liquefied acetylene and carbon dioxide and sodium, potassium or lithium metal as the starting materials. Stirring a dispersion of sodium with liquefied acetylene at room temperature then adding liquid carbon dioxide at about 5–0° C. over a half hour period and allowing the temperature to rise to about 0–25° C. while continuing stirring for as little as two hours gave substantial yields of sodium propiolate. Yields could be further increased by using a longer reaction period. In accordance with this invention yields are substantially increased even at short reaction times by adding a small amount of a simple tertiary amine such as trimethylamine to the reaction mixture.

The alkali metals, preferably sodium, may be used as dispersions in mineral oils or as sand or granules or small cubes. The ratio of each of acetylene and carbon dioxide to alkali metal can be as low as one mole per gram atom of the alkali metal and preferably to 6 moles. Large excesses provide no advantage. The reaction temperature may range from about −20° C. to about 35° C., preferably 0° C. to 35° C., and the pressure from 100 to 800 p.s.i.g. The reaction time generally ranges from as low as one hour to about 4 hours, or more. The loading of the alkyl amines may be in the range of from about 0.025 mole to about 3 moles per gram atom of alkali metal. Higher loadings may be used but to no advantage. Tertiary alkyl amines such as trimethylamine, triethylamine and tripropylamine are preferred. The corresponding primary and secondary amines and ammonia react rapidly with carbon dioxide to form carbamates and, therefore, are unsuitable or much less suitable for the carbonation reaction.

If desired, dry, inert diluents such as dioxane, tetrahydrofuran, methylal, $C_1$–$C_8$ aliphatic, alicyclic and and aromatic hydrocarbons may be used. However, these diluents do not appear to offer any advtange and may interfere with the recovery of the alkali metal propiolate or propiolic acid.

The process in accordance with the present invention provides a fast, one-step reaction from alkali metal to high yields of alkali metal propiolate making possible a route to cheaper propiolic acid and its eters. Moreover, the expensive and time-consuming preparation of sodium acetylide, the first step of the known two-step process for preparing propiolic acid is avoided. In addition, high conversions are obtained in shorter periods of time (1–1½ hours), at lower temperatures, e.g., −20 to 35° C., and without need for any special form of agitation at any time during the reaction.

The process can be operated safely in a continuous manner by first premixing a 1:1 mole mixture of liquid acetylene and carbon dioxide with a small amount of tertiary amine. The resulting mixture is then contacted with sodium dispersion.

The following examples are illustrative of the present invention.

EXAMPLE I

A 150 cc. stirred autoclave was dried by warming to about 50° C. and sweeping with nitrogen. Sodium dispersion (12 cc., 0.178 gram atom, 40% in liquid mineral oil) was added followed by closing and pressure testing with nitrogen. At −20 to −40° C. and at 135 p.s.i.g. acetylene (45 cc., 0.9 mole) was liquefied in the autoclave. Trimethylamine (4.7 c., 0.5 mole) was then added at −5° C., followed by warming to room temperature and stirring ½ hour. Occasional cooling was necessary to maintain room temperature. At 5 to 12° C. liquid $CO_2$ (37 cc., 0.5 mole) was added over a 15 min. period. The mixture was stirred 2 hours during which time the temperature rose slowly to 2° C. and the pressure was from 450 to 678 p.s.i.g.

The gases were bled off. The solid was washed with hexane to remove the small quantity of mineral oil, then dried in a vacumm oven at 40° C. The weight of finely divided, light brown powder was 15.1 grams. By analysis this contained 27.2% total sodium (not as free metal), 92.3% sodium propiolate and 4.4% sodium acetylide. No free sodium was detected. Conversions, based on total sodium, to sodium propiolate and sodium acetylide were 84.7% and 7.3% respectively. Propiolic acid can be isolated from the crude sodium propiolate reaction product by dissolving the same in distilled water, acidifying this solution with sulfuric acid, saturating the solution with ammonium sulfate and extracting the propiolic acid with ethyl acetate or ether or distilling it.

EXAMPLE II

The procedure described in Example I was followed in which sodium dispersion (12 cc., 0.19 gram atom) and liquid acetylene (45 cc., 0.9 mole) were stirred ½ hour at room temperature and 690 p.s.i.g. At 5 to 10° C. liquid carbon dioxide (37 cc., 0.5 mole) was added over a ½ hour period. Allowing the temperature to rise slowly to 21° C. the mixture was stirred for 2 hours at 610–725 p.s.i.g.

The solid product was washed with hexane and pumped dry (wt. 13.4 grams). Free sodium was present because sparks could be seen when a small quantity of the solid was sprinkled on water. The solid contained 32.7% total sodium (partly as free metal), 11.8% sodium acetylide, and 47.8% sodium propiolate. Based on total sodium the conversion to sodium propiolate and sodium acetylide were 33.7% and 17.3%, respectively. This demonstrated that substantial conversion to sodium propiolate and sodium acetylide is possible using liquefied acetylene and carbon dioxide and sodium metal as starting materials without trimethylamine as a catalyst.

EXAMPLE III

The procedure of Example I was followed except that ammonia (1.9 cc., 0.05 mole) was used instead of trimethylamine. The solid product isolated weighed 12.8 g., and contained 37.2% total sodium (not as free metal), 14.1% sodium propiolate and 30.6% sodium acetylide. Based on total sodium (0.2 gram atom) the conversions to sodium propiolate and sodium acetylide were 10.0% and 39.6%, respectively. This shows the loss in yield of sodium propiolate caused by the presence of ammonia in the reaction.

The above data demonstrate that the present invention provides a novel, effective, one-step process for the production of sodium propiolate based on sodium, liquid acetylene and liquid carbon dioxide. The sodium propiolate, which is produced in high yields particularly when prepared in contact with simple tertiary amines, is readily convertible to propiolic acid, propiolic acid esters and acrylic acid. It will be understood, however, that this invention is not limited to these specific examples since numerous variations will be apparent to those skilled in this art without departing from the scope of the appended claims.

We claim:

1. The process which comprises reacting an alkali metal in a pressure zone with liquid acetylene and liquid carbon dioxide while said pressure zone is maintained under those conditions of temperature and pressure which preserve said acetylene and said carbon dioxide in the liquid state, whereby to form an alkali metal propiolate as a reaction product.

2. The process which comprises reacting an alkali metal in a pressure zone with liquid acetylene and liquid carbon dioxide in contact with a small catalytic amount of tertiary alkyl amine while said pressure zone is maintained under those conditions of temperature and pressure which preserve said acetylene and said carbon dioxide in the liquid state, whereby to form an alkali metal propiolate as a reaction product.

3. The process as defined in claim 2, in which the alkali metal is sodium and the amine is trimethylamine.

4. The process as defined in claim 3, in which the reactant ratio is at least one mole acetylene and one mole carbon dioxide per gram atom of sodium.

5. The process as defined in claim 4, in which the reaction temperature is about —20° to 35° C., pressure is from 100 to 800 p.s.i.g.

6. The process for preparing propiolic acid which comprises reacting one gram atom of an alkali metal in a pressure zone with at least one mole of liquid acetylene and at least one mole of liquid carbon dioxide at temperatures of from about —20° to 35° C., pressure of from 100 to 800 p.s.i.g. and in contact with a small catalytic amount of a tertiary alkyl amine while said conditions of temperature and pressure in said pressure zone are maintained to preserve said acetylene and said carbon dioxide in the liquid state to form the alkali metal propiolate, converting the propiolate to propiolic acid and isolating the propiolic acid.

7. The process as defined in claim 6, in which the alkali metal is sodium and the amine is trimethylamine.

References Cited
UNITED STATES PATENTS

| | | | |
|---|---|---|---|
| 2,194,363 | 3/1940 | Macallam | 260—533 |
| 2,205,885 | 6/1940 | Jackson et al. | 260—533 |

FOREIGN PATENTS

| | | |
|---|---|---|
| 1,367,373 | 6/1964 | France. |

LORRAINE A. WEINBERGER, Primary Examiner

D. E. STENZEL, Assistant Examiner

UNITED STATES PATENT OFFICE
CERTIFICATE OF CORRECTION

Patent No. 3,541,144  Dated November 17, 1970

Inventor(s) Robert J. Tedeschi and George L. Moore

It is certified that error appears in the above-identified patent and that said Letters Patent are hereby corrected as shown below:

Col. 1, line 52, "5-0°" should read -- 5-10° --;
       line 54, "0-25°C." should read -- 20-25°C. --;
       line 65, -- 3 -- should be inserted after "preferably Col. 2, line 9, delete "and" (second occurrence);
       line 11, "advtange" should read -- advantage --;
       line 17, "eters" should read -- esters --;
       line 40, "4.7 c." should read -- 4.7 cc. --;
       line 46, "2°C." should read -- 23°C. --.

SIGNED AND
SEALED
MAR 16 1971

(SEAL)
Attest:

Edward M. Fletcher, Jr.
Attesting Officer

WILLIAM E. SCHUYLER, JR
Commissioner of Patents